Feb. 3, 1970   A. F. BLEIWEISS ET AL   3,493,819
FLASHERS
Filed Feb. 23, 1967   4 Sheets-Sheet 1
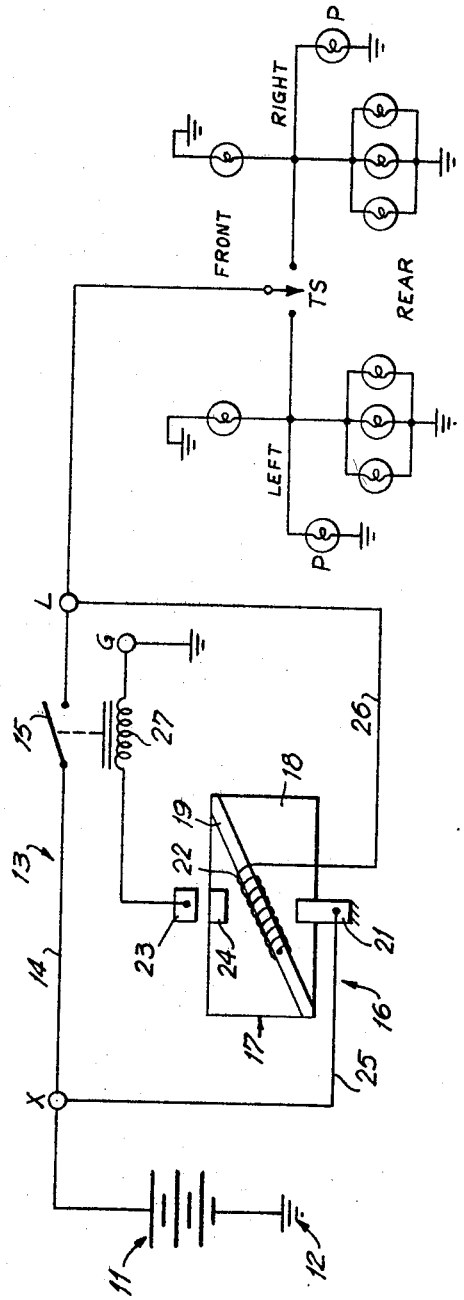
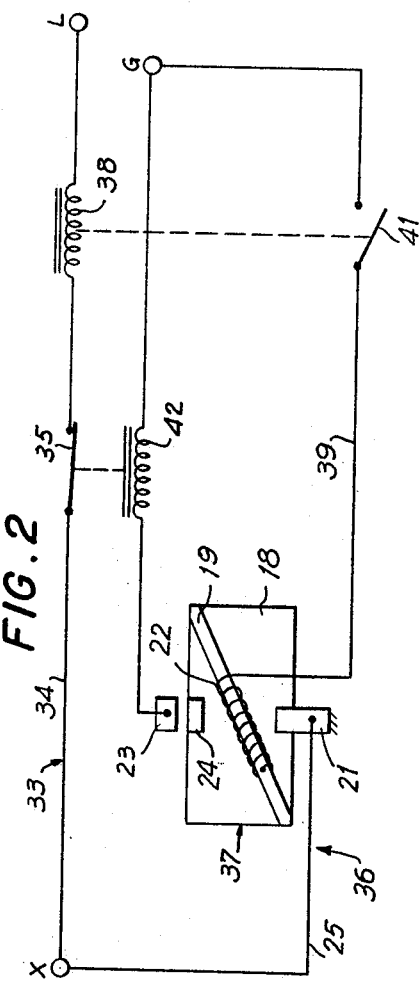
INVENTORS
ARTHUR F. BLEIWEISS
GEORGE COLOMBO
BY JOHN B. DICKSON
BORIS ORLOV
ATTORNEYS

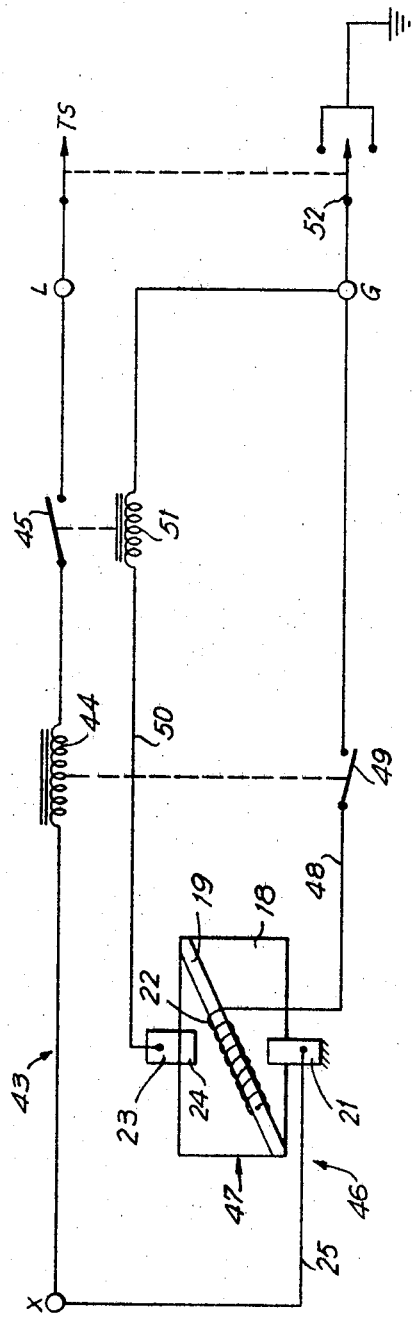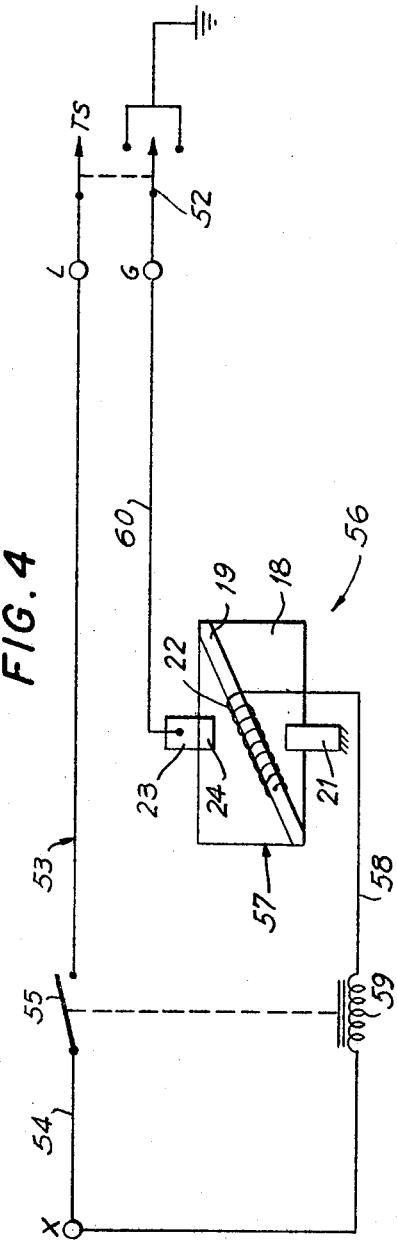
INVENTORS
ARTHUR F. BLEIWEISS
GEORGE COLOMBO
JOHN B. DICKSON
BORIS ORLOV
BY
ATTORNEYS

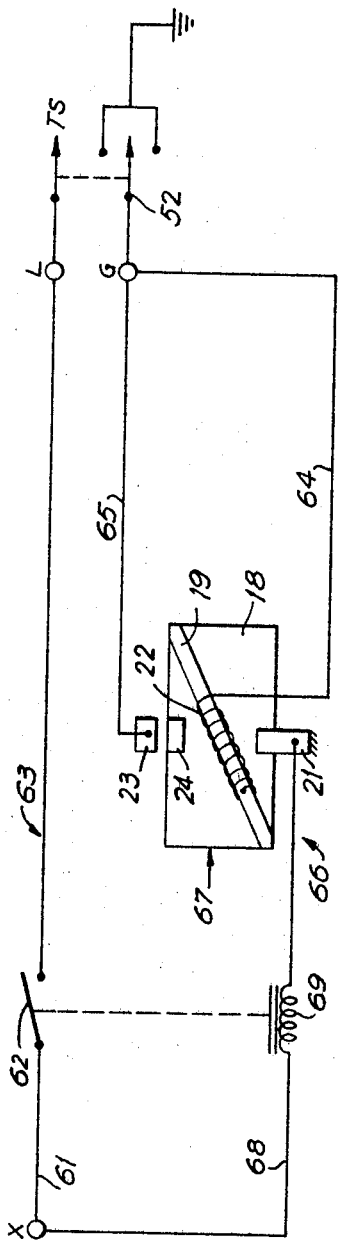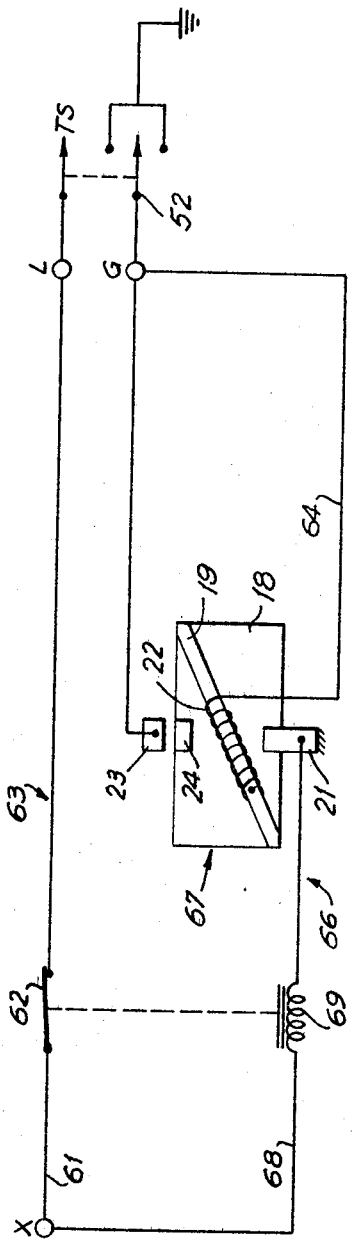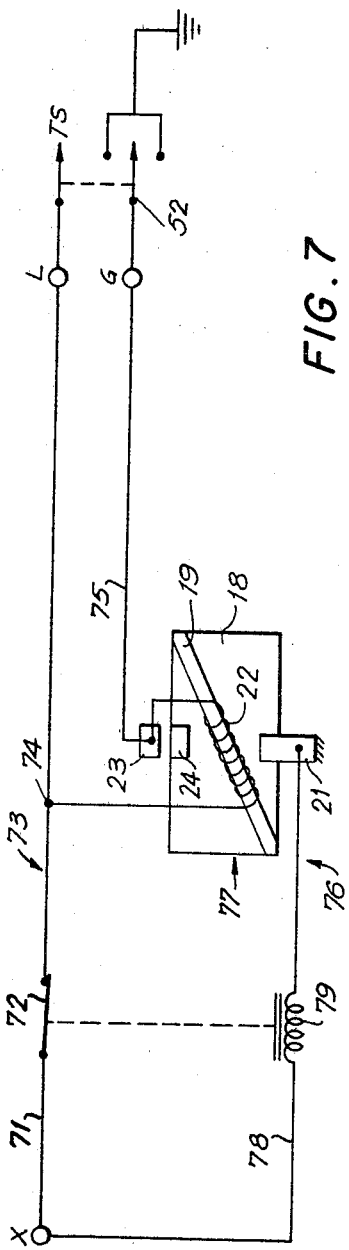

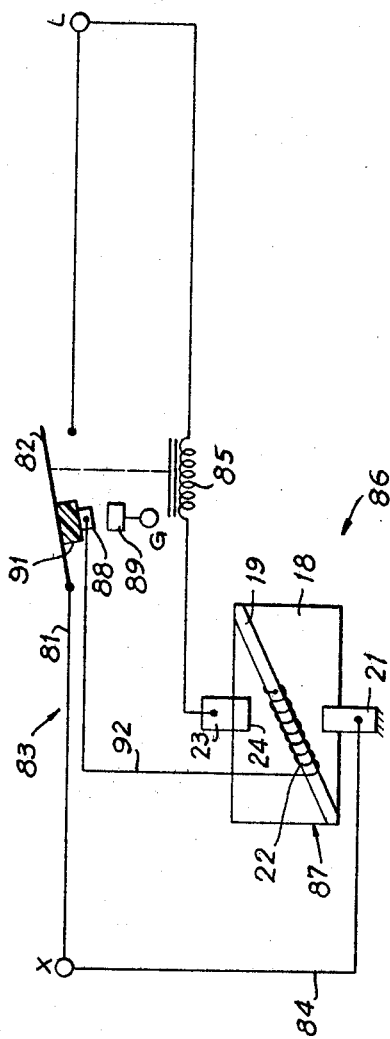

3,493,819
FLASHERS

Arthur F. Bleiweiss, New York, and George Colombo, East Rockaway, N.Y., John B. Dickson, Clewiston, Fla., and Boris Orlov, Woodhaven, N.Y., assignors to Lehigh Valley Industries, Inc., New York, N.Y., a corporation of Delaware
Filed Feb. 23, 1967, Ser. No. 618,158
Int. Cl. H01h 47/00
U.S. Cl. 317—123                                    17 Claims

ABSTRACT OF THE DISCLOSURE

A flasher for flashing a load including a load circuit operative to carry a load current for the flashing of a load and a timing circuit in parallel with the load circuit and operative to carry a current of low value as compared with the load current. The timing circuit operatively controls the load circuit and the flashing rate thereof with the low current in the timing circuit allowing heat responsive elements in the timing circuit to operate at low temperature thereby contributing substantially to an increase in life of the flasher, more uniform and greater reliability of operation.

Background of the invention

This invention relates generally to a flasher of the type useful for flashing the signal lamps or hazard warning lamps of an automotive vehicle. In the art, flashers have generally been characterized as "fixed load" flashers or "variable load" flashers. In the fixed load type of flasher is designed to have a particular flashing rate based on a predetermined load and a variation in the load will cause a variation in the flashing rate. For automotive flashers, standards for flashing rate have been set up by SAE and thus a fixed load flasher is designed to flash at a rate within the SAE standards for the predetermined load. If the flasher is connected to a different load, its flashing rate will vary and the variation may change the flashing rate sufficiently to make it unacceptable as regards the SAE specifications. Thus while the flasher will operate and flash, the flash rate may not be acceptable and thus the flasher is considered to be of the fixed load type.

A variable load flasher is one in which the flashing characteristics or flashing rate is determined by the parameters of the flasher and does not depend upon the load. Thus within reasonably broad limits the flashing rate will remain substantially constant regardless of changes in the load.

A typical fixed load flasher is shown in U.S. Patent 2,756,304 issued to James W. Welsh on July 24, 1956, while a typical variable load flasher is shown in U.S. Patent 2,822,444 issued to George Colombo et al. on Feb. 4, 1958.

The flashers disclosed in the aforesaid patents utilize, for their operative elements, a snap element or vane and a pull element or pull ribbon. The snap element is constructed so as to have a relaxed or restored position with the pull element secured thereto to hold it in a constrained position. The pull element is heat expansible and, on heating, releases the snap element asd allows it to snap to the restored position. Subsequent cooling of the pull element snaps the snap element back to the constrained position, and it is the alternate heating and cooling of the pull element that controls cycling of the flasher. By mounting a suitable circuit controlling contact on the snap element and pull element assembly, the snap action can be utilized to make and break a load circuit.

While such devices have generally operated satisfactorily for their intended purpose, substantial load currents travel through the snap element and/or pull element during the load illuminating portion of the cycle. Due to the internal resistance of the snap element and pull element combination, excessive heating and subsequent cooling of the elements takes place which provides a deteriorating effect on the assembly, the elements thereof and the connections which can eventually contribute to flasher failure. By lowering the current through the flasher elements, more uniform operation and longer life has resulted.

Further, the substantial load currents travelling through the internal resistances of such devices introduce relatively high voltage drops which adversely reduce the illumination output of the signal bulbs by lowering the voltage effective across the signal bulbs during the illuminating portion of the cycle. As the internal resistances increase with increased temperature of operation due to the excessive heating, this further increases the voltage drop and adverse effects on the illumination output of the signal bulbs.

By providing a separate circuit of relatively low internal resistance for the load current, and by lowering the current through the flasher elements, more uniform operation, longer life and reduced voltage drops has resulted.

Summary of the invention

Generally speaking, in accordance with the invention, a circuit for controlling the flashing of a load from a power source is provided which includes a load circuit adapted to carry the full load current during the "on" part of the cycle and a timing circuit is provided in parallel with the load circuit for controlling the flashing operation of the load circuit. The timing circuit operates at low current as compared with the current in the load circuit and thus the heating of the timing elements in the timing circuit is substantially reduced as compared with the prior known arrangements. Additionally, the heating and cooling rate is substantially insensitive to the value of the load current.

Accordingly, it is an object of this invention to provide a flasher in which the circuit to the load is controlled by a second circuit in which the current is a fraction of the current through the circuit to the load.

Another object of the invention is to provide a flasher wherein a load circuit is monitored by a timing circuit operating at low current with the heat responsive elements in the timing circuit operating at low temperature.

A further object of the invention is to provide a flasher of increased life by the utilization of parallel timing and load circuits.

Still another object of the invention is to provide a flasher wherein the heat responsive elements are located in a low current subsidiary circuit for controlling the flashing of a load electrically connected in a load circuit.

Another object of the invention is to provide a flasher whose flashing rate is independent of the load current.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

Brief description of the drawings

For a fuller understanding of the invention, reference is had to the following description taken in connection with the accompanying drawings, in which:

FIG. 1 is a schematic representation of one type of flasher constructed in accordance with the invention, connected into a typical signalling system; and FIGS. 2 through 8 are schematic representations of other forms of flasher construction.

Description of preferred embodiments

Referring now to FIG. 1, the flasher schematically depicted incorporates a vane and pull ribbon of a type well known in the art. The vane may be constructed as disclosed in the aforesaid U.S. Patent 2,756,304 and the contact arrangement and heater winding may be of the type disclosed in the aforesaid U.S. Patent 2,822,444. Thus a detailed description of the vane construction, pull ribbon attachment, heater winding and mounting arrangement is deemed unnecessary. A contact is mounted fixed with respect to a moveable contact carried by the vane with the contacts making and breaking a circuit as a result of snapping of the vane between its two positions. The normal position of the vane and pull ribbon assembly is the constrained position when the pull ribbon is cool, and in this condition the contacts are open. On heating and expansion of the pull ribbon, the vane snaps to a restored position to close or make the contacts.

A typical automotive turn signal signalling system is depicted schematically in FIG. 1. A battery 11 grounded at one side 12 is connected to an input terminal X. The grounded signal lamps are connected to a load terminal L through a turn signal switch TS. Left and right banks of signal lamps are schematically indicated with a single lamp in each bank for the front of the vehicle and three signal lamps connected in parallel in each bank for the rear of the vehicle. Also indicated are pilot lamps P which would be located at the dashboard to signal to the operator the flashing of the left or right bank of lamps. As is known, the manual switching of the turn signal switch to left or right mode connects the respective bank into the circuit and the flasher, which is connected between the X and L terminals, functions to alternately make and break a circuit to the signal lamps for the flashing of the lamps. It is also known in the art to provide a switch known as a hazard warning switch to connect both banks of signal lamps to a flasher circuit for the flashing of all signal lamps to indicate a hazard situation. Since the signal function as well as the hazard function is well known in the art, no further details thereon need be given. Furthermore, since any known signalling systems or hazard warning systems can be utilized with the flashers of the instant invention, the figures other than FIG. 1 will show only the load terminal L, the input terminal X and so much of the ground terminal G or the turn signal system as is deemed necessary for a complete understanding of the flasher and its operation.

It is also to be understood that, while certain elements of the flasher may be shown connected to the X terminal with other elements to the L terminal, the flashers shown are generally without polarity and the connections may generally be reversed without in any way changing the operation of the flasher.

Referring to FIG. 1, a load circuit is provided for carrying the load current from the battery to the turn signals or, in other words, between terminals X and L. The load circuit, indicated generally as 13, includes a circuit connection 14 and a relay armature 15 which acts as a switch to make and break the load circuit on closing and opening of the armature.

A timing circuit indicated generally as 16 is connected in parallel with the load circuit and effects the timing of the load circuit by controlling the operation of relay armature 15. The timing circuit includes a heat responsive switch 17 including a snap element or vane 18, a pull element or pull ribbon 19 connected across the snap element, a fixed mounting 21, a heater winding 22, a fixed contact 23 and a moveable contact.

One end of the heater winding is connected to pull ribbon 19 or a point of equal potential and the remainder of the heating winding is in heat transfer relationship with and electrically insulated from the pull ribbon. The moveable contact is mounted on the snap element and normally disengaged with the fixed contact when the pull element is in the cooled condition. The snap element is electrically connected to the X terminal through a conductor 25 connected to fixed mounting 21. Heater winding 22 is electrically connected to the load terminal L through a conductor 26 and the fixed contact 23 is connected to ground G through a relay coil 27. The operation of FIG. 1 flasher is as follows. When the turn signals switch is actuated, the load circuit is open as a result of the normally open position of relay armature 15 and current therefore flows through the secondary circuit from the X terminal through conductor 25, fixed mounting 21, vane 18, pull ribbon 19, heater winding 22 and conductor 26 to the load terminal L and thence through the signal lamps to ground. The signal lamps are not illuminated due to the high resistance of heater winding 22 as compared to the low cold resistance of the signal lamps keeping the current through the secondary circuit at a very low value.

When heater winding 22 has heated sufficiently, it heats and expands pull ribbon 19 causing the vane to snap to the restored position to thereby close contacts 24 and 23. This completes a circuit directly from fixed mounting 21 through the vane 18 and closed contacts 23, 24 to ground through relay coil 27. At the same time, the completion of the circuit through relay coil 27 immediately closes the switch controlled by relay armature 15 to complete load circuit 13 and illuminate the signal lamps, thereby shunting the circuit through the heater winding and allowing the heater winding to cool. As soon as the pull ribbon cools sufficiently, it snaps the vane to the constrained position thereby opening contacts 23, 24 and deactivating the relay coil whereupon the load circuit opens and extinguishes the signal lamps. So long as the turn signal switch remains closed, heating of the heater winding will recommence and the flasher will thus flash in a cycle controlled by the opening and closing of contacts 23, 24 as a result of the snapping of the vane.

The current travelling through the timing circuit 16 is a function of the resistance of the heater winding during one part of the cycle and of the relay coil during another part of the cycle. These can be designed to draw extremely low current since their operation is completely independent of the high current drawn through the load circuit to illuminate the signal lamps when the relay armature is closed. Thus the timing circuit operates on low current and at low temperature and thus the destructive temperatures previously experienced by the heat responsive switch 17 are eliminated. With this arrangement, the means for controlling the operation of the heat responsive switch and for controlling the operation of the load circuit are in the timing circuit in parallel with the load circuit. The high current drawn through the load circuit for illumination of the signal lamps is limited to circuit connection 14 and relay armature 15, either of which element will be substantially affected over a period of time by the current passing through the load circuit during bulb illumination.

The circuit of FIG. 1 can be related to what has been known as a "normally open" flasher in that illumination of the signal lamps does not commence immediately upon closing of the turn signal switch. On the closing of said switch, the heating of the heater winding immediately commences and the signal lamps illuminate when the heater winding has sufficiently heated the pull ribbon to cause the snapping of the vane to its restored position.

The circuit arrangement of FIG. 2 can be related to the normally closed type of flasher where illumination of the signal lamps commences immediately on the closing of the turn signal switch. A load circuit 33 includes a conductor 34, a relay armature 35 acting as a normally closed switch and a relay coil 38 with the load circuit connected between the X and L terminals.

A timing circuit 36 is connected in parallel with the load circuit and includes a heat responsive switch 37 similar to that described in connection with FIG. 1. Heater winding 22 is connected through a conductor 39 and a normally open relay armature 41 to ground connection G and fixed contact 23 is also connected to the ground terminal through a relay coil 42. Relay coil 42 controls the operation of relay armature 35 while relay coil 38 controls the operation of relay armature 41.

The operation of the circuit of FIG. 2 is as follows. On closure of the turn signal switch, the load current flows through load circuit 33 to illuminate the selected signal lamps immediately energizing relay coil 38 to close relay armature 41 to thereby connect the heater winding 22 to ground. While the signal lamps are illuminated through the load circuit current flows through the secondary circuit through the heater winding to commence heating and expansion of the pull ribbon. The high resistance of the heater winding provides for low current through the timing circuit. Upon snapping of the vane as a result of expansion of the pull ribbon, contacts 23, 24 close to thereby complete a shunt circuit to ground through relay coil 42. Relay coil 42 thereby opens the switch defined by relay armature 35 to break the load circuit and extinguish the signal lamps. At the same time, relay coil 38 is deenergized to open the switch controlled by relay armature 41 and break the heating circuit whereby the pull ribbon is allowed to cool. When the pull ribbon cools sufficiently to snap the vane to the constrained position, the cycle repeats. As before, the relay coil 42 in the timing circuit is designed to draw little current and thus the current flowing through the timing circuit at any particular time is extremely low as compared with the current flowing through the load circuit.

The provision of relay coil 38 in the load circuit may also be utilized to provide an indication of positive pilot signal bulb outage. For example, if the number of turn signal bulbs connected to the L terminal is as shown in FIG. 1, relay coil 38 can be adjusted to operate when three rear lamps, one front lamp and one pilot bulb are illuminated, but not to operate on reduced current flow which would be caused, for example, when one of the front or rear signal bulbs burns out. If outage of one of the bulbs occurs and the current through the load circuit is insufficient to cause relay coil 38 to attract relay armature 41, heat responsive switch 37 will not cycle and the load current will remain in a steady on condition. In other words, the remaining bulbs will be steadily illuminated, giving a signal and also indicating to the vehicle operator that a bulb outage has occurred. By proper adjustment of relay coil 38, the occurrence of the outage condition may be set to indicate outage of any selected number of bulbs.

In this connection, it is noted that relay coil 38 may be termed a current coil with the operation of same being responsive to the current in the load circuit while relay coil 42 in the timing circuit may be termed a voltage coil operative in response to the potential applied thereacross with the current drawn by a voltage coil being extremely low. Relay coil 27 in the timing circuit of FIG. 1 may likewise be termed a voltage coil. The terms "current coil" and "voltage coil" are used for the sake of convenience and not by way of limitation.

Referring now to FIG. 3, a load circuit 43 includes a serially connected voltage relay coil 44 and a relay armature 45 acting as a switch and in a normally open condition. A timing circuit 46 is connected in parallel with respect to the load circuit and includes a heat responsive switch 47 as heretofore described with the exception that in the cooled condition of the pull ribbon, contacts 23, 24 are normally closed or are in engagement with one another. Heater winding 22 is connected to ground through a circuit connection 48 and a relay armature 49 acting as a normally open switch and controlled by relay coil 44.

Fixed contact 23 is also connected to ground through a circuit connection 50 and a voltage relay coil 51. In order that the timing circuit not draw current continually, ground connection G is connected to a suitable contact 52 on the turn signal switch for connection to ground only when the turn signal switch is operated in either direction or when actuated for hazard warning.

While relay armature 45 in the load circuit is normally open, the circuit of FIG. 3 starts instantaneously in the fashion of a normally closed circuit in the following manner. On actuation of the turn signal switch, the G terminal is connected to ground at the same time that the load terminal is connected to the signal lamps. A potential is immediately impressed across relay coil 51 through normally closed contacts 23, 24 to immediately close relay armature 45 and complete the load circuit to the signal lamps. At the same time, on the making of the load circuit, relay coil 44 closes relay armature 49 to complete a parallel heating circuit through the heater winding 22 and circuit connection 48 to ground to commence heating and expansion of the pull ribbon. When the pull ribbon expands sufficiently, vane 18 snaps to the restored position to thereby open contacts 23, 24 and break the circuit through relay coil 51. This immediately opens relay armature 45 to break the load circuit and at the same time deenergizes relay coil 44 to open the heating circuit through relay armature 49. Thus the lamps are extinguished and the pull ribbon is allowed to cool whereafter the vane snaps to the constrained position to remake contacts 23, 24 to commence the cycle again. Thus, in FIG. 3, the load is illuminated at the time heating of the heat responsive switch is taking place and the load is extinguished during cooling of the heat responsive switch. This is also true in the FIG. 2 circuit but the opposite is true in the FIG. 1 circuit.

The FIG. 3 circuit also operates in accordance with a primary object of the invention to maintain at low value the heating of the heat responsive switch and the current through the timing circuit.

Due to the presence of current coil 44 in the load circuit, the FIG. 3 arrangement may be adjusted to provide a positive pilot outage indicator as described in connection with FIG. 2. If the current in the load circuit is insufficient to cause relay coil 44 to actuate relay armature 49, the heat responsive switch 47 will remain in the condition depicted in the drawing and a voltage will continue to be impressed across relay coil 51 to maintain the load circuit in the lamp illuminating condition.

Referring now to FIG. 4, a load circuit 53 serially connects the input terminal to the load terminal through a circuit connection 54 and a relay armature 55. The heater winding 22 is connected to the input terminal through a circuit connection 58 and a voltage relay coil 59 with the relay coil controlling the operation of relay armature 55 which acts as a normally open switch. The heat responsive switch 57 has contacts 23, 24 which are normally closed and contact 23 is connected directly to the ground terminal through a circuit connection 60. The ground terminal is connected to a contact 52 on the turn signal switch to connect the ground terminal to ground when the turn signal switch or hazard warning switch is actuated.

The circuit of FIG. 4 acts as a normally closed flasher even though relay armature 55 is normally open. On actuation of the turn signal switch, a circuit is immediately completed from the input terminal X to ground through relay coil 59, circuit connection 58, heater winding 22, pull ribbon 19, vane 18, contacts 24, 23 and circuit connection 60. The impressing of a potential across relay coil 59 immediately causes relay armature 55 to be moved to the switch closed position completing the load circuit and illuminating the signal lamps. Again the current through the timing circuit is extremely low and effects a heating of the heater winding to cause expansion of the pull ribbon and eventual snapping of the vane to the restored position whereupon contacts 23, 24 open and break the timing circuit. This breaks the circuit impressing a potential across relay coil 59 to open the load circuit and extinguish the signal lamps. When the pull ribbon has cooled sufficiently, the vane snaps to the constrained position and the cycle repeats.

Another circuit is shown in FIG. 5 wherein the load circuit 63 connected across the X and L terminals consists of a circuit connection 61 and a relay armature 62 positioned to act as a normally open switch. The timing circuit 66 includes a heat responsive switch 67 in which the heater winding 22 is connected directly to ground terminal G through a circuit connection 64 and contact 23 is also connected to ground terminal G through a circuit connection 65. Contacts 23, 24 are normally open when the pull ribbon is cool and holding the vane in a constrained condition. In the timing circuit the X terminal is connected to the vane through a circuit connection 68, a voltage relay coil 69 and fixed mounting 21.

The circuit operates in a manner akin to a normally open flasher in the following manner. On actuation of the turn signal switch, the selected signal lamps are connected to the L terminal and the G terminal is grounded. A voltage is impressed across the timing circuit through circuit connection 68, relay coil 69, fixed mounting 21, vane 18, pull ribbon 19, heater winding 22 and circuit connection 64. The relay coil 69 is responsive to the voltage impressed across the entire circuit and with the initial connection of the G terminal to ground and relay coil 69 and heater winding 22 in series, the voltage drop across the elements is less than the total voltage drop in the manner of the usual series circuit and the voltage relay coil is adjusted so as not to operate the relay armature when the heater winding is in series therewith. Thus initially the heater winding heats and the load circuit remains open. Upon snapping of the vane to the restored position, contacts 23, 24 are closed to shunt the heater winding and allow same to cool. At the same time, the entire potential is impressed across relay coil 69 and the voltage drop thereacross becomes sufficient to close relay armature 62 to complete the load circuit and illuminate the signal lamps. The signal lamps remain illuminated so long as the vane remains snapped to the restored position and when the pull ribbon has cooled sufficiently, the vane snaps to the constrained position to open contacts 23, 24 and thereby place heater winding 22 back in the series circuit with relay coil 69 to reduce the voltage drop thereacross below that required to hold in relay armature 62 and the load circuit is broken. Cycling thereafter occurs in the manner aforesaid.

A substantially identical circuit is shown in FIG. 6 except that relay armature 62 is normally closed. The load circuit of FIG. 6 would be instantaneously starting upon actuation of the turn signal switch at which time heating of the heater winding 22 would take place. Relay armature 62 would remain closed until the vane snapped to close contacts 23, 24 to shunt the heater winding and permit the entire voltage to be impressed across relay coil 69 whereby load circuit 63 would be open. Once the heater winding is shunted, it cools to snap the vane to the constrained position and the circuit thereafter cycles as will be apparent.

A circuit including a modified arrangement of the heater winding connection is shown in FIG. 7. Load circuit 73 includes a circuit connection 71 and a normally closed relay armature 72. Timing circuit 76 includes a heat responsive switch 77 similar to those previously described except that one end of heater winding 22 is connected as at 74 to the load circuit 73 and the other end of the heater winding is connected at ground potential. In the prior described heat responsive switches, one end of the heater winding was electrically connected to the pull ribbon. Fixed contact 23 is connected through a circuit connection 75 to the G terminal and the X terminal is connected, in the timing circuit, through a circuit connection 78 and a voltage relay coil 79 to the vane.

The operation of FIG. 7 is as follows. On actuation of the turn signal switch, the signal lamps are illuminated through the load circuit 73 as a result of the normally closed condition of relay armature 72. At the same time a circuit is completed through heater winding 22 from the X terminal through circuit connection 71 and the normally closed armature 72 through connection 74, heater winding 22, fixed contact 23 and circuit connection 75 to ground. While the signal lamps are illuminated, heating of heater winding 22 is taking place and upon snapping of the vane to the restored position contacts 23, 24 will close to complete the timing circuit from the X terminal through circuit connection 78, relay coil 79, fixed mounting 21, vane 18, contacts 23, 24 and circuit connection 75 to ground. On closure of contacts 23, 24 a voltage is impressed across voltage coil 79 to open relay armature 72 to thereby extinguish the signal lamps and also interrupt the heating of heater winding 22. Thus the heater winding cools down while the signal lamps are extinguished and when the vane snaps to the constrained position the cycle commences once again.

Turning now to FIG. 8, a load circuit 83 includes a circuit connection 81 and a relay armature 82 with the relay armature acting as a normally open switch. In timing circuit 86, a circuit connection 84 connects the X terminal to vane 18 and fixed contact 23 is connected to the load terminal L through a voltage relay coil 85. Contacts 23, 24 of the heat responsive switch 87 are normally closed when the pull ribbon is in the cool condition. A contact 88 is mounted through an insulator 91 on relay armature 82. A fixed contact 89 is disposed opposite contact 88 and is electrically connected to ground. The free end of heater winding 22 is connected through a circuit connection 92 to contact 88. Contacts 88, 89 are normally spaced from one another when relay armature 82 is in its normally open position with the contacts disposed for engagement when the relay armature is moved to the switch closed position.

On actuation of the turn signal switch, a potential is immediately impressed across the X and L terminals and thus across relay coil 85 through normally closed contacts 23, 24. This immediately effects a closing of relay armature 82 to close load circuit 83 and illuminate the signal lamps. At the same time, the relay armature moves contact 88 into engagement with contact 89 to complete a circuit to ground through heater winding 22. Thus while the signal lamps are illuminated, the heating of the heater winding and the pull ribbon is taking place. On snapping of the vane to the restored position, contacts 23, 24 open to break the circuit through relay coil 85 and thereby cause the opening of the load circuit which, at the same time, separates contacts 88, 89 to terminate the heating of the heater winding. The load circuit remains open until the pull ribbon has cooled sufficiently to permit the vane to snap to the constrained position, whereupon the cycle repeats so long as the turn signal switch is actuated.

From the foregoing circuits which are representative of circuits constructed in accordance with the teachings of the instant invention, it is apparent that the basic concept is the provision of a load circuit for carrying a load current of the order sufficient to illuminate the number of signal lamps which will be connected thereto through a turn signal or hazard warning switch and a timing circuit generally arranged in parallel with the load circuit for controlling the making and breaking of the load circuit to effect flashing of the signal lamps with the timing circuit constructed and arranged to operate at currents of low magnitude which are a fraction of the current which may be carried by the load circuit whereby destructive heating in the timing circuit is kept to a minimum. The timing circuit includes a heat responsive switch capable of controlling the position of contacts as the result of the cyclical heating and cooling of the heat responsive switch.

Automotive flashers constructed in accordance with various of the disclosed embodiments have demonstrated the improved results obtainable from the instant invention particularly as regards flasher life.

An additional advantage of the flashers disclosed herein which is not to be undervalued is their capability of operating at a flashing rate substantially independent of the load current. The heating rate of the heater windings is proportional to the resistance of the heating circuit and so long as the heating circuit, when closed, does not include the illuminated load, the heating rate will not vary. Each of the flashers disclosed in FIGS. 1 through 8 have heating circuits of constant heating rate regardless of whether the load circuit starts instantaneously or not.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

What is claimed is:

1. In combination, a load circuit including a first switch and a timing circuit connected in parallel with said load circuit and including a second switch, first means in said timing circuit for controlling the operation of said first switch and second means in said timing circuit for controlling the operation of said second switch, said second switch and said second means controlling the operation of same comprising a heat responsive switch.

2. The combination of claim 1 including a third switch in said timing circuit and third means in said load circuit for controlling the operation of said third switch.

3. The combination of claim 1 including first and second terminals across which said load circuit is connected and a ground terminal, said second means being a heat responsive switch connected to said first terminal and having a heater winding connected to said second terminal, said first means being a relay coil connected between said second switch and said ground terminal.

4. The combination of claim 1 including first and second terminals across which said load circuit is connected and a ground terminal, said second means being a heat responsive switch connected to said first terminal and having a heater winding connected to said ground terminal, said first means being a relay coil connected between said second switch and said ground terminal.

5. The combination of claim 4 including a third switch in series with said heater winding and said ground terminal and a relay coil for controlling said third switch connected in series with said first switch in said load circuit.

6. The combination of claim 4 wherein said first switch is a normally open armature switch and said second switch is a pair of normally open contacts.

7. The combination of claim 5 wherein said first switch is a normally closed armature switch and said second switch is a pair of normally open contacts.

8. The combination of claim 5 wherein said first switch is a normally open armature switch and said second switch is a pair of normally closed contacts.

9. The combination of claim 1 including first and second terminals across which said load circuit is connected and a ground terminal, said second means being a heat responsive switch having a heater winding connected in series with said first means to said first terminal, said first means being a relay coil, said second switch being connected to said ground terminal.

10. The combination of claim 9 wherein said first switch is a normally open armature switch and said second switch is a pair of normally closed contacts.

11. The combination of claim 1 including first and second terminals across which said load circuit is connected and a ground terminal, said second means being a heat responsive switch connected in series with said first switch to said first terminal, said heat responsive switch having a heater winding connected to said ground terminal, said second switch being connected to said ground terminal and comprising a pair of normally open contacts, said first means being a relay coil.

12. The combination of claim 11 wherein said first switch is a normally open armature switch.

13. The combination of claim 12 wherein said first switch is a normally closed armature switch.

14. The combination of claim 1 including first and second terminals across which said load circuit is connected and a ground terminal, said second means being a heat responsive switch connected to said first terminal and having a heater winding, said first means being a relay coil connected between said second switch and said second terminal, said first switch being an armature switch, and a third switch comprising a first contact connected to said ground terminal and a second contact connected to said heater winding, one of said contacts controlled by said first switch and insulated therefrom, said contacts of said third switch being normally separated and adapted for engagement when said armature switch is operated on by said relay coil.

15. The combination of claim 14 wherein said second switch is a pair of normally closed contacts.

16. In combination, a first terminal, a second terminal, a ground terminal, a first switch connected between said first and second terminals, a second switch, a heat responsive switch controlling the operation of said second switch, first means controlling the operation of said first switch and serially connected with said heat responsive switch to said first terminal, and a heater winding in heat transfer relationship with said heat responsive switch and connected between said second terminal and said ground terminal, said second switch being connected to said ground terminal.

17. The combination of claim 16 wherein said first switch is a normally closed armature switch, said first means is a relay coil and said second switch is a pair of normally open contacts.

References Cited

UNITED STATES PATENTS

| 1,767,582 | 6/1930 | Fisher. |
| 2,644,899 | 7/1953 | Perry. |
| 3,219,847 | 11/1965 | Morgan _____ 317—123 XR |
| 3,229,126 | 1/1966 | Creager. |
| 3,246,181 | 4/1966 | Bleiweiss et al. |
| 3,267,330 | 8/1966 | Almassy. |
| 3,358,160 | 12/1967 | Bleiweiss et al. |

LEE T. HIX, Primary Examiner

W. M. SHOOP, Jr., Assistant Examiner

U.S. Cl. X.R.

307—132; 315—77